US012811539B2

(12) United States Patent
Kim et al.

(10) Patent No.: US 12,811,539 B2
(45) Date of Patent: Nov. 24, 2026

(54) SOLAR COLOR MODULE AND COLOR TUNABLE SOLAR MODULE

(71) Applicant: RESEARCH INSTITUTE OF INDUSTRIAL SCIENCE & TECHNOLOGY, Pohang-si (KR)

(72) Inventors: Young-Su Kim, Pohang-si (KR); A-Rong Kim, Pohang-si (KR); Sung-Ju Tark, Pohang-si (KR)

(73) Assignee: RESEARCH INSTITUTE OF INDUSTRIAL SCIENCE & TECHNOLOGY, Pohang-si (KR)

( * ) Notice: Subject to any disclaimer, the term of this patent is extended or adjusted under 35 U.S.C. 154(b) by 86 days.

(21) Appl. No.: 18/847,674

(22) PCT Filed: Feb. 16, 2023

(86) PCT No.: PCT/KR2023/002285
§ 371 (c)(1),
(2) Date: Apr. 11, 2025

(87) PCT Pub. No.: WO2023/214646
PCT Pub. Date: Nov. 9, 2023

(65) Prior Publication Data

US 2026/0045899 A1 Feb. 12, 2026

(30) Foreign Application Priority Data

May 4, 2022 (KR) ........................ 10-2022-0055660

(51) Int. Cl.
*H02S 30/10* (2014.01)
*H02S 20/20* (2014.01)
*H02S 20/26* (2014.01)

(52) U.S. Cl.
CPC .............. *H02S 20/20* (2014.12); *H02S 20/26* (2014.12); *H02S 30/10* (2014.12)

(58) Field of Classification Search
CPC ........... H02S 30/00; H02S 30/10; H02S 40/00
See application file for complete search history.

(56) References Cited

U.S. PATENT DOCUMENTS 10,256,360 B2 4/2019 Balasubramanian et al.
2002/0153038 A1 10/2002 Umemoto et al.
(Continued)

FOREIGN PATENT DOCUMENTS

CN 210129840 U 3/2020
CN 213693590 U 7/2021
(Continued)

OTHER PUBLICATIONS

English machine translation of Yoon et al. (KR 10 1370676) published Mar. 7, 2014.*
(Continued)

*Primary Examiner* — Christina Chern
(74) *Attorney, Agent, or Firm* — Renner, Otto, Boisselle & Sklar, LLP

(57) ABSTRACT

The present invention relates to a solar module, and to a solar color module or a color tunable solar module formed so as to enable changing colors. This disclosure introduces a solar color module with a removable color layer, allowing color changes. It includes a solar cell, an encapsulant, and a surface layer, all fixed by a frame. The module's design allows easy attachment and removal of the color layer.

17 Claims, 10 Drawing Sheets

(56) References Cited

U.S. PATENT DOCUMENTS

| | | | |
|---|---|---|---|
| 2012/0152320 A1 | 6/2012 | Aguglia | |
| 2015/0207001 A1 | 7/2015 | Lin et al. | |

FOREIGN PATENT DOCUMENTS

| | | | | |
|---|---|---|---|---|
| JP | 2001053298 A | 2/2001 | | |
| JP | 3805996 B2 | 8/2006 | | |
| KR | 20120016903 A | 2/2012 | | |
| KR | 20130047876 A | 5/2013 | | |
| KR | 101370676 B1 * | 3/2014 | ............ | H10F 19/00 |
| KR | 20150091657 A | 8/2015 | | |
| KR | 101874827 B1 | 7/2018 | | |
| KR | 101982589 B1 | 5/2019 | | |
| KR | 102060695 B1 | 12/2019 | | |
| KR | 20220029203 A | 3/2022 | | |
| WO | 2013172930 A1 | 11/2013 | | |
| WO | 2021009719 A1 | 1/2021 | | |

OTHER PUBLICATIONS

English machine translation of Kim et al. (KR 10 1874827) published Jul. 6, 2018.*

Gewohn Timo et al: "Postproduction Coloring of Photovoltaic Modules With Imprinted Textiles", IEEE Journal of Photovoltaics, IEEE, vol. 11, No. 1, Nov. 16, 2020 (Nov. 16, 2020), pp. 138-143, XP011827781.

Extended European Search Report issued for corresponding European Patent Application No. 23799529.5, mailed Jul. 25, 2025.

International Search Report (ISR) corresponding to counterpart International Patent Application PCT/KR2023/002285, mailed May 16, 2023, with English translation.

* cited by examiner (a)

(b)

SOLAR COLOR MODULE AND COLOR TUNABLE SOLAR MODULE

TECHNICAL FIELD

The present disclosure relates to a solar color module or a color variable solar module formed so that colors may be changed in a solar module.

BACKGROUND ART

Recently, in accordance with the goal of carbon neutrality, various technologies are being used to implement zero energy houses to reduce carbon emissions. There among, there are provided solar technologies, which are representative technologies, related to solar technology, known as Building Attached Photovoltaic (BAPV) and Building Integrated Photovoltaic (BIPV) technologies, which attach a solar module to a rooftop or an exterior wall of a building, which are receiving attention. A Building Integrated Photovoltaic (BIPV) module is a building material replacing a building exterior material and performing both the functions of the building exterior material and the solar module.

A silicon solar cell, which is most commonly used in production of a solar module, is opaque and monochromatic, so the silicon solar cell is difficult to expect an aesthetic effect from when applied to building. To improve this, a method such as attaching a colored PolyVinyl Butyral (PVB) film to protective glass or forming a colored film or a color layer separately thereon below an Ethylene Vinyl Acetate (EVA) film has been developed. Recently, in order to use a building integrated solar cell, a technology in which a patterned layer with a pattern is inserted into a lower portion of the glass, so that a portion transmitting light generates power, and the remaining portion thereof form color to reflect light and hide a lower solar cell, has been introduced.

A color solar module using this technology also requires high reliability that can be guaranteed for 20 to 25 years, similar to a general solar cell module, and is generally difficult to replace once installed. However, when using a color solar module as a building exterior material, unlike a general solar module, aesthetic purposes take priority, so it is necessary to be able to change the color solar module to have different colors or shapes according to user preference.

In particular, road soundproofing wall facilities or fence-type solar power panels are often used for advertising purposes, so the pictures or colors used therein should be replaced. Therefore, if color of a color module can be easily changed, the cost can be greatly reduced, as compared to changing the entire module. However, due to reliability issues, a current color module adopts a permanently fixed structure, making it almost impossible to replace only the colored portion. Some patents have proposed a method of coupling displays such as LCDs to solar modules, but the method has not been widely commercialized. Therefore, there is a need to develop solar modules that do not have reliability problems and can replace colors.

(Patent Document 1) JP 2001-053298 A

SUMMARY OF INVENTION

Technical Problem

The present disclosure is intended to solve the above problems, and an aspect of the present disclosure is to provide a color variable solar module or a solar color module that can change color by further forming a fixing portion so that a color layer may be changed.

Solution to Problem

In order to achieve the above object, in the present disclosure, a color variable solar module or a solar color module formed as follows is provided.

According to an embodiment of the present disclosure, the solar color module includes a color layer forming color and a fixing portion coupling the color layer to a solar module so that the color layer may be installed on and removed from the solar module.

According to an embodiment of the present disclosure, the color variable solar module includes a solar cell generating power using incident sunlight; an encapsulate sealing the solar cell from the outside; a surface layer provided to protect the solar cell on a surface of the encapsulate; a frame fixing a structure of the solar cell, the encapsulate, and the surface layer; and a fixing portion attached to or formed integrally with the frame, and fixing the laminated color layers.

According to an embodiment of the present disclosure, the color variable solar module includes a solar cell generating power using incident sunlight; a first module including an encapsulant sealing the solar cell from the outside; a second module including a plate-shaped color layer forming color; and a fixing portion in which a coupling structure is formed so that the first module and the second module may be coupled and separated.

Advantageous Effects of Invention

As set forth above, according to an aspect of the present disclosure, through the structure described above, the present disclosure has an effect of replacing color in an existing solar module, or providing a solar module of which color may be replaced.

MODE FOR INVENTION

Hereinafter, specific embodiments of the present disclosure will be described with reference to the attached drawings. However, the spirit of the present disclosure is not limited to the presented embodiments, and other regressive inventions or other embodiments included in the spirit of the present disclosure may be easily suggested by a person skilled in the art who understands the spirit of the present disclosure by adding, changing, or deleting other components within the scope of the same spirit, but it will also be said to be included within the scope of the present disclosure.

Figure 1:
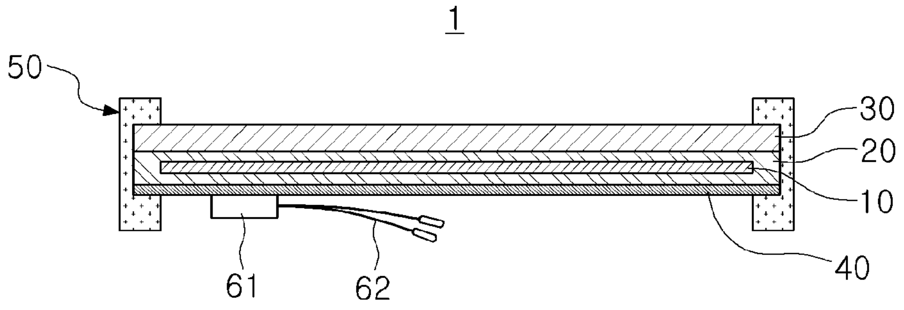
FIG. 1 is a cross-sectional view of a solar module without a color layer.

FIG. 1 illustrates a solar module 1 without a color layer. The solar module 1 is formed around a solar cell 10 receiving sunlight and generating power, and an encapsulant 20 is formed surrounding all surfaces of the solar cell, and the encapsulant 20 seals the solar cell 10 to prevent moisture or foreign substances from entering the solar cell 10 to protect the solar cell 10 from the outside.

A surface layer 30 is added to one surface of the encapsulant 20 to be formed to transmit sunlight and protect the solar cell 10 from external impacts. In order for the solar cell 10 located thereinside to generate power, the surface layer 30 has a very high degree of light transmittance. A back sheet 40 is further formed on an opposite side of the surface layer 30 of the encapsulant. This serves to protect the solar cell 10 from impacts and prevent external rainwater or foreign substances from entering thereinto. A frame 50 fixing the layered structure from a side surface may be further included. In addition, a wiring box 61 and a power line 62 connected to the back sheet 40 to connect power externally may be further included. In addition, all general components required for the solar module 1 may be included.

All embodiments to be described below include descriptions of the configuration of the solar module 1.

Figure 2:
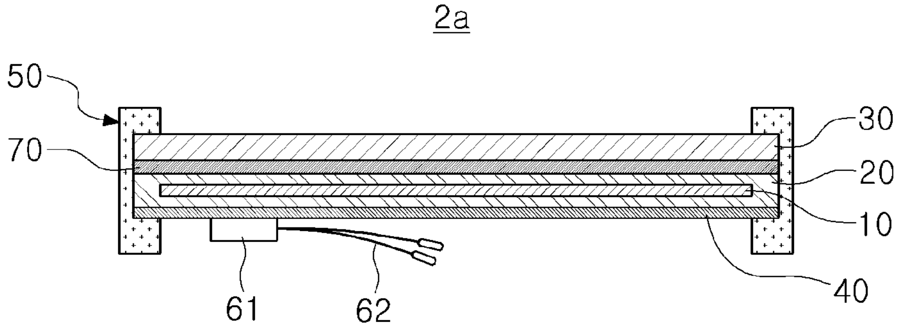
FIG. 2 is a cross-sectional view of a solar module including a color layer according to a first embodiment of the present disclosure.
Figure 3:
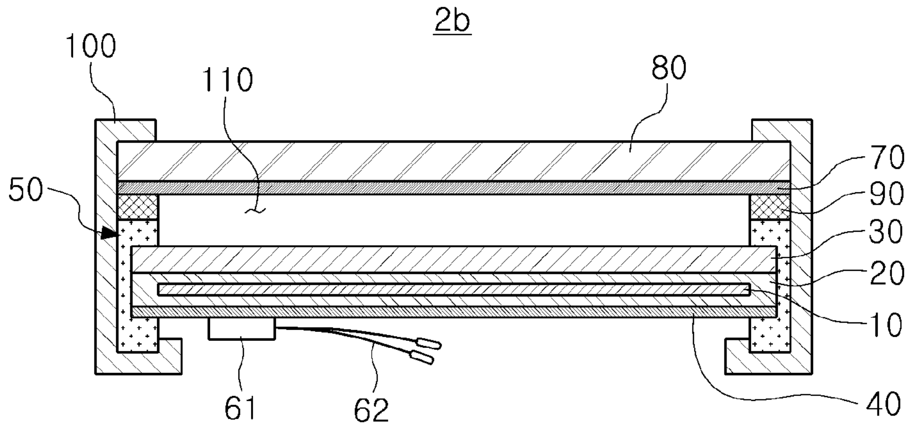
FIG. 3 is a cross-sectional view of a solar module including a color layer according to a second embodiment of the present disclosure.
Figure 4:
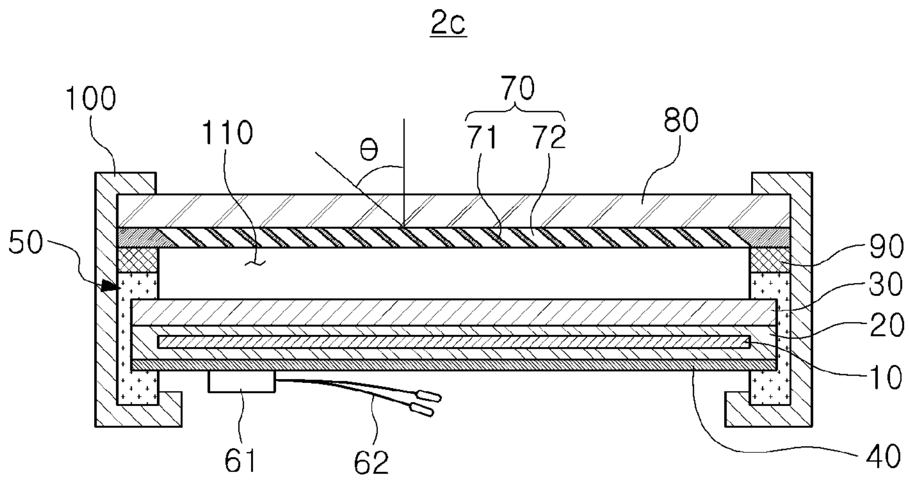
FIG. 4 is a cross-sectional view of a solar module when a color layer forms an optical pattern according to an embodiment of the present disclosure.

FIGS. 2 and 3 illustrate solar modules 2*a* and 2*b* formed by integrally adding a color layer 70. FIG. 4 illustrates a case in which the color layer 70 of a solar module 2*c* is integrally formed by adding the color layer 70 to form an optical pattern.

According to aesthetic and commercial requirements, the solar modules 2*a*, 2*b*, and 2*c* are further provided with a color layer 70. The color layer 70 may use a material of cyanine dyes including at least one of metal ions of magnesium (Mg), nickel (Ni), copper (Cu), cobalt (Co), zinc (Zn), chromium (Cr), platinum (Pt), palladium (Pd), and iron (Fe). In addition, a front surface may be used as a continuous color layer 70 as illustrated in FIGS. 2 and 3. Alternatively, as illustrated in FIG. 4, a color developing layer 71 and a light transmitting layer 72 may be formed to have an inclination (θ) between 15 and 85 degrees from a vertical direction, based on a surface on which the color layer 70 is formed, to include an optical pattern. The color developing layer 71 is configured to display color, and the light transmitting layer 72 is configured to facilitate light transmission. When formed in this manner, the sunlight is maximally incident when the solar module 2*c* is installed vertically. The color layer 70 of all embodiments to be described below includes both a case in which the color layer 70 is formed continuously, as well as a case in which the color layer 70 is formed discontinuously, and includes the color developing layer 71 and the light transmitting layer 72.

Referring to FIG. 2, the solar module 2*a* including the color layer 70 in the first embodiment is further provided with a color layer 70 the encapsulant 20 and the surface layer 30. As the color layer 70 is positioned between the encapsulant 20 and the surface layer 30, the color layer 70 is colored when viewed from the outside. Even in this case, the frame 50 is formed to fix a layer structure including the color layer 70 from a side surface.

Referring to FIGS. 3 and 4, the solar modules 2*b* and 2*c* including the color layer 70 in the second embodiment further includes a cover window 80, a color layer 70, and a spacer 90 on a side on which sunlight is incident on the solar module 1 not including the color layer 70. That is, sunlight passes through an air layer 110 formed by the cover window 80, the color layer 70, and the spacer 90, and is incident thereon with a structure similar to the solar module 1 not including the color layer 70 described above.

The cover window 80 is formed so that sunlight is easily incident thereon, and protects the color layer 70 and other components located thereinside from external impacts. The cover window 80 is a layer configured for the same purpose as the surface layer 30, and may be formed of the same material. The color layer 70 is positioned as a layered structure in contact with the cover window 80. The color layer 70 is protected from the cover window 80 and is maintained without contact with air and moisture. A spacer 90 is provided between the color layer 70 and the frame 50, which has a structure configured to be similar to the solar module 1 without the color layer 70. The air present inside due to the spacer 90 forms an air layer 110, and the air layer 110 is maintained in a sealed state. The spacer 90 may be formed to have a certain thickness to maintain a height of a gap of the air layer 110 and to prevent gas included in the air layer 110 from being discharged externally. Then, a double frame 100 is fixed from the side so that the layer structure as described above is maintained. In addition, unlike when there is a frame 50, the spacer 90 may be located on one side of the frame 50, when there is no frame 50, the spacer 90 may be located in a certain section of the surface layer 30. In this case, all layer structures may be fixed with a double frame 100 without a frame 50.

The solar modules 2*a*, 2*b*, and 2*c* including the color layer 70 of the first and second embodiments are solar modules 2*a*, 2*b*, and 2*c* in which the color layer 70 is formed integrally, and there is a difficulty in changing the color, so an embodiment having a structure that can change the color layer 70 in which this problem has solved will be additionally described.

Figure 5:
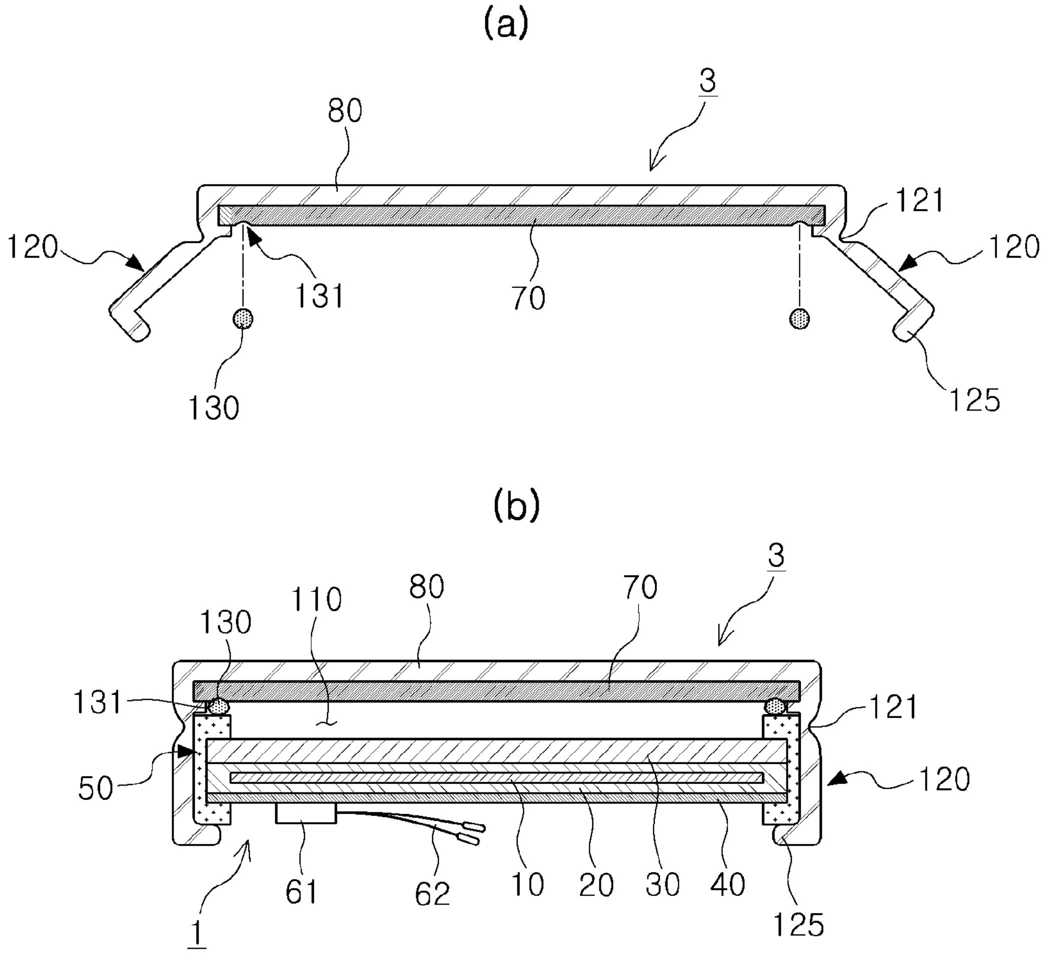
FIG. 5 is a cross-sectional view of a solar color module according to a third embodiment of the present disclosure. (a) in FIG. 5 is a cross-sectional view of a solar color module, and (b) in FIG. 5 is a cross-sectional view of a solar color coupled to a solar module without a color layer.

FIG. 5 (a) illustrates a solar color module 3. FIG. 5 (b) illustrates a state in which the solar color module 3 is coupled to the solar module 1 without the color layer 70.

Figure 6:
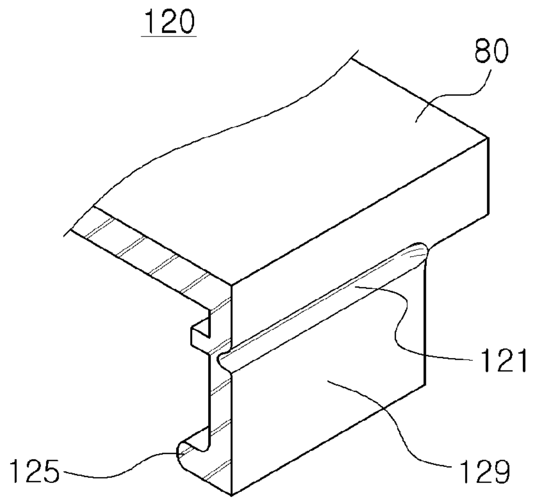
FIG. 6 is a perspective view of a fixing portion according to a third embodiment of the present disclosure.

FIG. 6 is a perspective view of a fixing portion 120 of the solar color module 3.

A third embodiment is illustrated by referring to FIGS. 5 (a) and 5 (b). The solar color module 3 is configured to be coupled to the solar module 1. In the solar color module 3, a cover window 80 and a color layer 70 are tightly coupled in a layered structure in an order on which sunlight is incident. The solar color module 3 further includes a fixing portion 120 so that the color layer 70 may be coupled to and removed from the solar module 1. As mentioned above, the color layer 70 is configured to be coupled to the solar module 1 to display color, and the cover window 80 is also formed of a material that allows sunlight to pass therethrough, as described above, and is configured to be tightly coupled to the layer 70. Therefore, when viewed from the outside, it is configured to be colored by the color layer 70.

The solar color module 3 of the third embodiment further includes a fixing portion 120. The solar color module 3 includes a color layer 70 forming color, a cover window 80 provided in a layered structure with the color layer, and a fixing portion 120 coupling the color layer 70 to the solar module 1 so that the color layer 70 may be installed on and removed from the solar module 1.

When the color layer 70 is coupled to the solar module 1, a sealing member 130 sealing the air layer 110 formed by air located between the color layer 70 and the solar module 1, is further included.

Through the fixing portion 120, the color layer 70 and the cover window 80 can be used by coupling the same to the solar module 1 not including the previously installed color layer 70. In other words, the fixing portion has a structure that is coupled to the solar module 1 to be easily and removed. The fixing portion 120 may be formed integrally with the cover window 80, or may be formed separately. When formed separately, a color module frame (not shown) is further included, so that a structure of the color module can be fixed from the side surface, similar to the role of the frame 50 mentioned above. The fixing portion 120 includes all components which allow the solar color module 3 to be coupled to and then removed from the solar module 1 without the color layer 70. For example, it can be coupled using screws and bolts.

As an example of the fixing portion 120, the fixing portion 120 includes a hinge portion 121 formed to be rotatable and a locking portion 125 protruding so as to be coupled to one end of the solar module 1. The hinge portion 121 may include a general mechanical part formed to allow two fixed parts to move relative to each other. Due to this configuration, the locking portion 125 may be rotated outwardly and has a certain degree of freedom at an angle. The locking portion 125 may be configured to have an 'L' shaped cross-section to be coupled and fixed to a lower portion of the solar module 1. After the locking portion 125 is locked to the lower portion of the solar module 1, the locking portion 125 is configured to be fixed using the hinge portion 121 to be tightly fitted. If there is a shape that can be fixed by being locked to the solar module 1, the solar color module 3 may be configured to be fixedly coupled to the lower portion of the solar module 1, that is, the other portion, other than one end of the frame 50, through the hinge portion 121 and the locking portion 125 described above.

Since the present embodiment is coupled through this structure, an effect of easy removal is also provided. Therefore, when it is desired to change the color or pattern of the color layer 70, it can be easily replaced.

The hinge portion 121 is not a general mechanical structure that allows two parts to move relative to each other, but may be formed integrally with the fixing portion 120 and may be implemented by having a shape or material that is partially different from the fixing portion 120. For example, the fixing portion 120 may be formed to have a constant thickness, and may be comprised of a hinge portion 121 of which a thickness thereof is thinner than the constant thickness of the fixing portion 120. Therefore, the fixing portion 120 is formed in a structure that can be easily folded in the hinge portion 121, which has a relatively thin thickness. Alternatively, other portions of the fixing portion 120 may be formed at a constant density and have a lower density in the hinge portion 121 than that of the fixing portion 120, so that the fixing portion 120 may also be configured to be easily folded in the hinge portion 121. That is, when the hinge portion 121 is configured with a change in thickness or density, the hinge portion 121 may be formed of a material that is easily deformed, returns to an original state after deformation, and is not easily broken.

The locking portion 125 may be formed to have a protruding cross-section of one end shaped like a 'ㄷ'. The locking portion 125 may be formed in a 'ㄷ'-like structure in accordance with a lower structure of the solar module 1 to increase coupling force. The shape of the locking portion 125 will be described in detail below.

The solar color module 3 may further include a sealing member 130 located below the color layer 70. When the solar color module 3 is coupled to the solar module 1, an air layer 110 is formed therein. The sealing member 130 is configured to separate the air layer 110 formed therein from the outside for the reliability of the solar module 1, and prevent damage to the color layer 70 and the surface layer 30 during fixation and removal. The sealing member 130 also serves to prevent moisture from entering the interior of the solar module 1 which is coupled to the solar color module 3.

The sealing member 130 is formed of a material that is deformed to a certain degree by pressure but is not broken. For example, a high molecular weight polymer such as rubber may be used. The sealing member 130 is located close to the frame 50 of the solar module 1 and is located below the color layer 70. The sealing member 130 may be integrally attached to the solar color module 3, but may also be additionally fixed during installation. A first groove 131 formed to be concave is provided so that the sealing member 130 is positioned at a certain position, from an opposite side of the surface in which the color layer 70 is in close contact with the cover window 80. The depth of the first groove 131 may be thinner than the thickness of the color layer 70. Depending on the design, the sealing member 130 may contact the cover window 80 because the sealing member 130 is thicker than the color layer 70. A portion of the sealing member 130 is located in the first groove 131 and can be fixed so as not to move other than the portion in which the first groove 131 is formed. With this configuration, the sealing member 130 is prevented from moving out of its designed position and affecting reliability. In addition to the shape of the groove, the sealing member 130 may be fixed using all general fixing means such as an adhesive.

Figure 7:
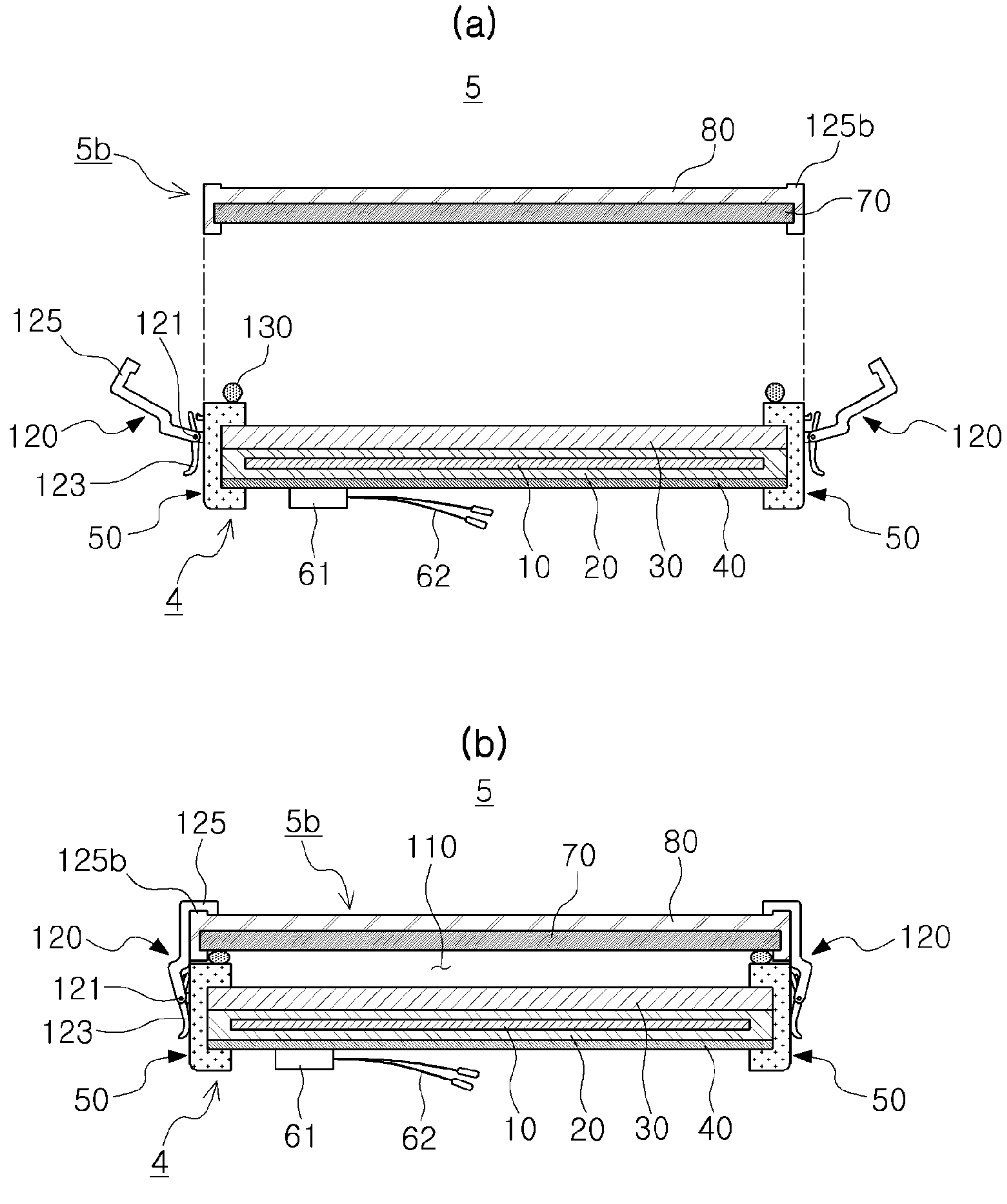
FIG. 7 is a cross-sectional view of a color variable solar module according to fourth and fifth embodiments of the present disclosure. (a) in FIG. 7 is a cross-sectional view illustrating a state in which a first module and a second module according to the fifth embodiment are not coupled, and (b) in FIG. 7 is a cross-sectional view illustrating a state in which the first module and the second module are coupled.
Figure 8:
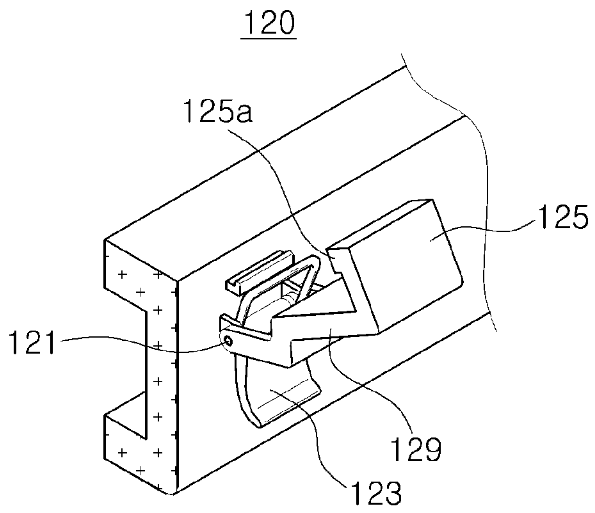
FIG. 8 is a perspective view of a fixing portion according to fourth and fifth embodiments of the present disclosure.

FIG. 7 (a) illustrates a color variable solar module 4 including a fixing portion 120. FIG. 7 (b) illustrates a form in which a color variable solar module 4 is coupled to a solar color module 5*b*. FIG. 8 illustrates a perspective view of the fixing portion 120 included in the color variable solar module 4.

The fourth embodiment illustrates a color variable solar module 4 to which the fixing portion 120 is coupled. The color variable solar module 4 may be coupled to the solar color module 5*b* provided with a color layer 70. The color variable solar module 4 includes a solar cell 10, an encapsulant 20, a surface layer 30, and a frame 50 fixing the layer structure, and include a fixing portion 120 coupled to the frame 50, or that can be added when coupled to the solar color module 5*b*.

The color variable solar module 4 includes a solar cell 10 generating power using incident sunlight, an encapsulant 20 sealing the solar cell 10 from the outside, a surface layer provided to protect the solar cell 10 on a surface of the encapsulant 20, a frame 50 fixing a structure of the solar cell 10, the encapsulant 20, and the surface layer 30, and a fixing portion 120 attached to or formed integrally with the frame 50 and fixing laminated color layers 70.

The color variable solar module 4 further includes a sealing member 130 which is in contact with the frame 50 or the surface layer 30 and is deformable according to pressure. The structure of the solar cell 10, encapsulant 20, surface layer 30, and frame 50 are the same as described above.

A side surface of the frame 50 may include a pressing portion 123 in addition to the hinge portion 121 and the locking portion 125 described above.

The fixing portion 120 may be formed and fixed by a hinge portion 121 and a locking portion 125 as described above. Another embodiment of the fixing portion 120 is as follows. Referring to FIGS. 7 and 8, a locking portion 125 fixed in a direction in which sunlight is incident so that a solar color module 5*b* including a color layer 70 positioned in the direction in which sunlight is incident through the locking portion 125, is formed. The locking portion 125 may be configured in a 'ㄴ' shape as described above, but a locking protrusion 125*a* at the end may be further formed in a 'ㄷ' shape, so that the locking protrusion 125*a* may be coupled to an upper portion of the solar color module with a stepped structure 125*b* and increase a coupling force. In addition, a pressing portion 123 is formed so that a pressing portion 123 may be formed in the fixing portion 120, so when force is applied to the pressing portion 123, the locking portion 125 may be fixed, and may be formed in a structure in which the locking portion 125 in a fixed state is released when force is applied to the pressing portion in a direction opposite to the direction in which it is fixed. That is, when force is applied to the pressing portion 123 with the locking portion 125 positioned to fix the solar color module 5*b*, the locking portion 125 is configured so that the locking portion 125 is pulled due to the force applied to the pressing portion 123 connected to the hinge portion 121, and the hinge portion 121 is fixed without rotating in the pulled state. When the locking portion 125 is desired to be removed, when force is applied to the pressing portion 123 in the opposite direction, the coupling state is released and loosed, and the locking portion 125 may be rotated by the hinge portion 121, and thus the locking portion 125 may be easily removed. In this manner, it is formed so that the color layer can be coupled to and removed from the solar color module 5*b*.

The solar color module may further include a sealing member 130 which is in contact with the frame 50 or the surface layer 30 and is deformable according to pressure. Reliability of the color variable solar module 4 may be increased by further including a sealing member 130. The sealing member 130 may be attached to one end of the frame 50 coupled to the solar color module 5*b*. Even in this case, the fixed position may be prevented from being deviated through an inlet groove (not shown) formed in the surface layer 30 or the frame 50, and the sealing force can be increased. Other components that are not mentioned but have the same name are the same as those described above.

According to another embodiment, the first modules 4, 6*a*, and 7*a* and the second modules 5*b*, 6*b*, and 7*b* may be formed as a combination of color variable solar modules 5, 6, and 7 together with the fixing portion 120.

The color variable solar modules 5, 6, and 7 include first modules 4, 6*a*, and 7*a*, second modules 5*b*, 6*b*, and 7*b*, and a fixing portion 120. The first modules 4, 6*a*, and 7*a* are formed to include a solar cell 10 generating power using incident sunlight and an encapsulant 20 sealing the solar cell 10 from the outside. The second modules 5*b*, 6*b*, and 7*b* include a plate-shaped color layer 70 forming color, and a cover window 80 tightly coupled to an upper portion of the color layer 70. A fixing portion 120 is formed to allow the first modules 4, 6*a*, 7*a* and the second modules 5*b*, 6*b*, 7*b* to be coupled or separated. The fixing portion 120 may be integrally coupled to the first modules 4, 6*a*, and 7*a* or the second modules 5*b*, 6*b*, and 7*b*. Alternatively, when coupling the first modules 4, 6*a*, and 7*a* to the second modules 5*b*, 6*b*, and 7*b*, the fixing portion 120 may be installed together. The color variable solar modules 5, 6, and 7 below will be described in more detail as specific examples.

The color variable solar module 5 according to the fifth embodiment illustrates a case in which a fixing portion 120 is integrally provided with the first module 4.

The fixing portion 120 includes a rotatable hinge portion 121. As described above, the fixing portion 120 is formed to have a certain thickness or density, and the thickness of the hinge portion 121 may be thinner than the thickness of the fixing portion 120 or the density of the hinge portion 121 may be lower than that of the fixing portion 120.

Referring to FIGS. 7 and 8, a stepped structure may be formed on an external surface of the cover window 80 of the second module 5*b*. Alternatively, a second groove (not shown) may be formed to be concave from the surface of the cover window 80 in a direction in which the color layer 70 is coupled. In this case, a locking protrusion 125*a* in which one end of the fixing portion 120 is fixed to the first module 4 and the other end thereof is fitted into a second groove or a step formed in the second module 5*b* is included. The shape of the locking protrusion 125*a* may vary depending on the corresponding structure formed in the second module 5*b*.

Figure 9:
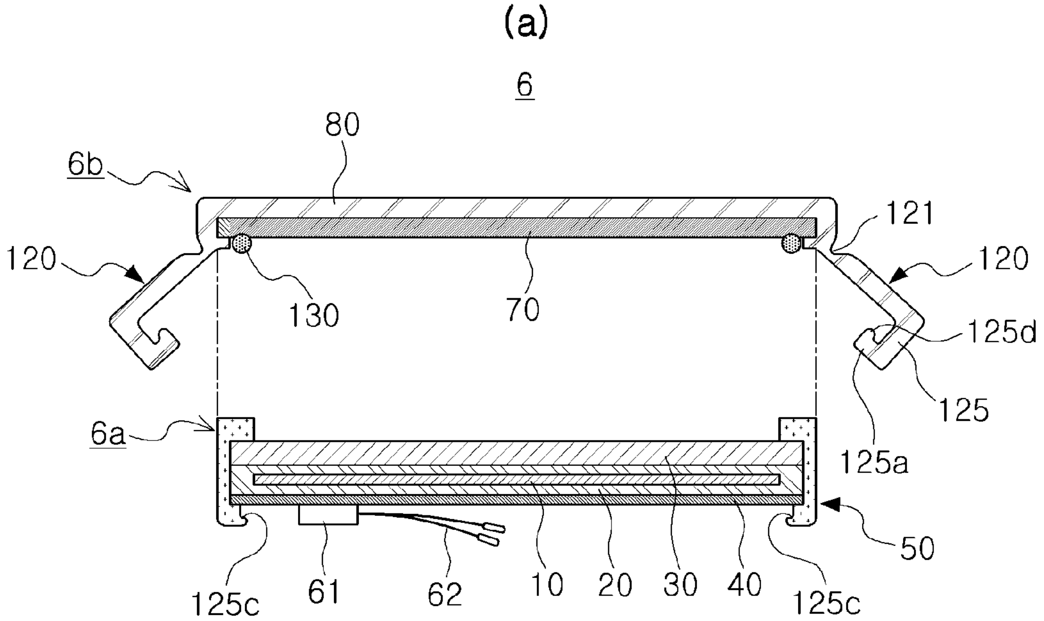
FIG. 9 is a cross-sectional view of a color variable solar module according to a sixth embodiment of the present disclosure. (a) in FIG. 9 is a cross-sectional view illustrating a state in which a first module and a second module according to the sixth embodiment are not coupled, and (b) in FIG. 9 is a cross-sectional view illustrating a state in which the first module and the second module are coupled.
Figure 9:
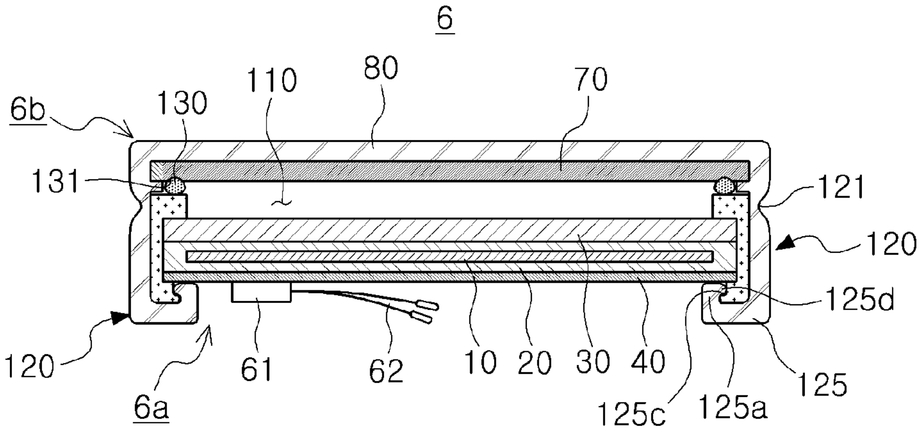
Figure 10:
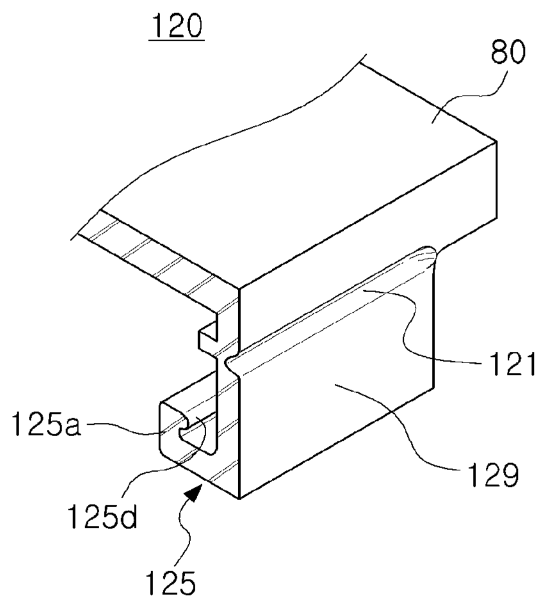
FIG. 10 is a perspective view of a fixing portion according to a sixth embodiment of the present disclosure.

FIG. 9 illustrates a color variable solar module 6 when the fixing portion 120 is fixed or attached to a second module 6*b*. FIG. 9 (a) illustrates a state in which a first module 6*a* and a second module 6*b* are separated, and FIG. 9 (b) illustrates a state in which the first module 6*a* and the second module 6*b* are coupled. FIG. 10 illustrates a shape of another fixing portion 120.

A color variable solar module 6 according to a sixth embodiment may have a fixing portion 120 coupled to the second module 6*b*. In this case, the second module 6*b* has the same role and configuration as the solar color module 3 according to the third embodiment of the present disclosure. That is, the solar color module 3 includes a color layer 70 and a cover window 80, and the fixing portion 120 may be formed of a hinge portion 121 and a locking portion 125. However, in order to increase a coupling force between the first module 6*a* and the second module 6*b*, a structure in which the first module 6*a* and the second module 6*b* are coupled to each other by the fixing portion 120 may be changed.

In addition to the above-mentioned '└' shape, the locking portion 125 of the fixing portion 120 may be formed in a '⊏' like structure in accordance with a lower structure of the first module 6*a* to increase a coupling force in a lower portion thereof. In addition, in order to increase an internal sealing force by increasing the coupling force with the locking portion 125 of the fixing portion 120, a locking groove 125*c* may be formed in the frame 50 of the first module 6*a*, and a protruding portion 125*d* formed to protrude may be further included at the end of the locking portion 125 of the second module 6*b*. Accordingly, the protruding portion 125*d* is fitted into and coupled to the locking groove 125*c*, thereby increasing a degree of sealing and further increasing the coupling force. In addition, the shape of the locking portion 125 and the corresponding structure includes all structures that can be fixed to the frame 50 or a part other than the frame 50 of the first module 6*a* in addition to the above-mentioned shape. However, in this case, since it may be difficult to couple the same to each other, one end of the fixing portion 120, that is, the locking portion 125 may be formed of a shape or material of which a shape can be easily changed. For example, the locking portion 125 may be formed of a material such as silicon to be completely sealed and flexible. When coupled this structure, they are not easily separated even when unexpected vertical and lateral forces are applied, but have the effect of being able to separate when desired. However, it is not limited to these materials and shapes and includes all possible shapes and materials.

Figure 11:
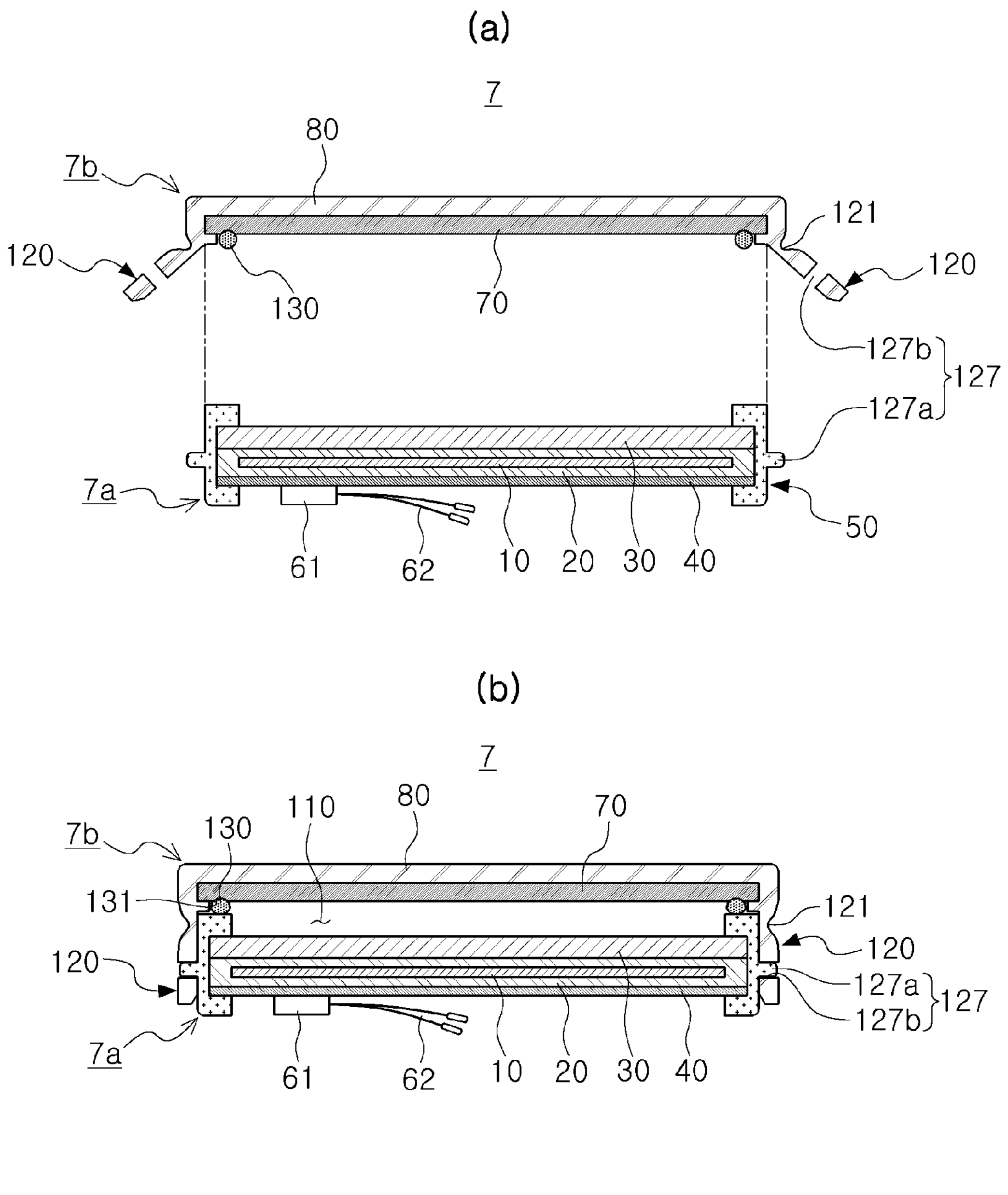
FIG. 11 is a cross-sectional view of a color variable solar module according to a seventh embodiment of the present disclosure. (a) in FIG. 11 is a cross-sectional view illustrating a state in which a first module and a second module according to the seventh embodiment are not coupled, and (b) in FIG. 11 is a cross-sectional view illustrating a state in which the first module and the second module are coupled.
Figure 12:
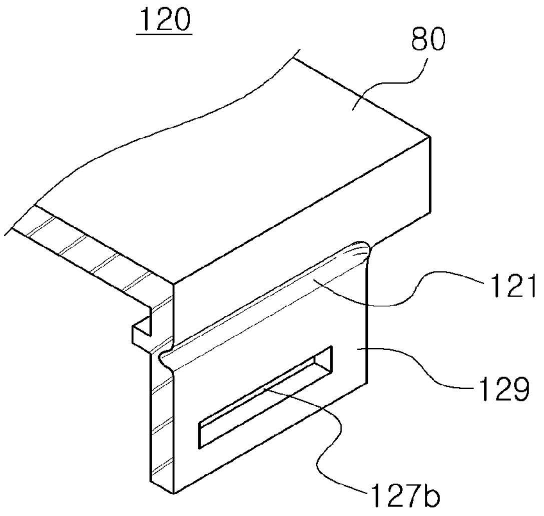
FIG. 12 is a perspective view of a fixing portion according to a seventh embodiment of the present disclosure.

FIG. 11 illustrates another embodiment of the color variable solar module 7 when the fixing portion 120 is fixed or attached to the second module 7*b*. FIG. 11 (a) illustrates a case in which the first module 7*a* and the second module 7*b* are separated, and FIG. 11 (b) illustrates a case in which the first module 7*a* and the second module 7*b* are coupled. FIG. 12 illustrates the shapes of the hinge portion 121 and the fitting portion 127 included in the second module 7*b*.

According to a seventh embodiment, like the sixth embodiment, the fixing portion 120 may be coupled to a second module 7*b*. In this case, since the second module 7*b* has the same role and structure as the solar color module 3 of the third embodiment, the solar color module 3 includes a color layer 70 and a cover window 80. As another example of the fixing part 120, the fixing portion 120 may be formed of a hinge portion 121 and a fitting portion 127. The fitting portion 127 may be formed with a fitting groove 127*b* formed in a fitting protrusion 127*a* formed on the first module 7*a* and an extension surface 129 extending from the hinge portion 121 of the second module 7*b*. The hinge portion 121 in this embodiment is the same as the hinge portion 121 mentioned above. An extension surface 129 is formed extending from the hinge portion 121 of the fixing portion 120 attached to or included in the second module 7*b* and having a thickness, and a fitting groove 127*b* penetrates the extension surface 129 is formed. The fitting groove 127*b* may not penetrate depending on a degree of protrusion of the fitting protrusion 127*a*. A fitting protrusion 127*a* is formed in the first module 7*a* in a shape corresponding to the fitting groove 127*b*. The fitting protrusion 127*a* is generally formed on the frame 50 and is formed to protrude at a certain height. Accordingly, the first module 7*a* and the second module 7*b* may be coupled and separated through the fixing portion 120 including the hinge portion 121 and the fitting portion 127.

Even in the case of the fifth to seventh embodiments, a sealing member 130 may be further included in addition to the first modules 4, 6*a*, and 7*a*, the second modules 5*b*, 6*b*, and 7*b*, and the fixing portion 120. The function and effect of the sealing member 130 are the same as described above.

Unlike the first to second embodiments, in the third to seventh embodiments, the solar color module 3 or the second module 5*b*, 6*b*, 7*b* is connected to the existing color layer 70, since the solar color module 3 or the second modules 5*b*, 6*b*, and 7*b* may be coupled to or separated from the solar module 1 or the first modules 4, 6*a*, and 7*a* on which the existing color layer 70 is not formed, it has the effect of being able to replace the exterior of the building, remodeling, or changing the image used for fences and soundproof walls at a relatively low cost. In addition, since the technology of the solar module 1 developed for long-term use can be used as is and only the color or pattern can be changed, it can be an eco-friendly business model with less burden of replacement.

In addition, since the technology of the solar module 1 developed for long-term use can be used as is and only the color or pattern can be changed, it can be an eco-friendly business model with less burden of replacement. That is, the scattering layer may be formed in a layered structure to contact the color layer 70, and a separate scattering layer including TiO2 haze balls with a refractive index between 2.0 and 2.2 can be formed.

Figure 13:
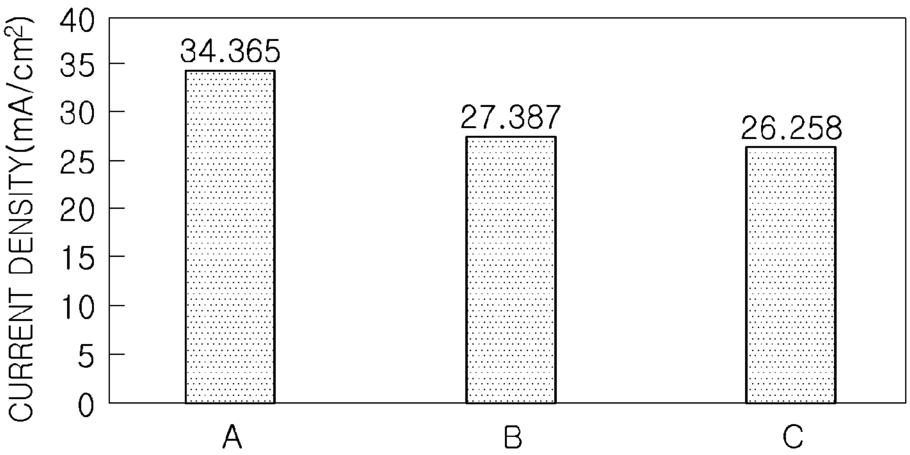
FIG. 13 is a graph illustrating a degree of power loss as a color layer is added by measuring current density in the solar module.

FIG. 13 is a graph comparing an amount of current generated in a solar module according to embodiments. Table 1 presents the results of the graph in FIG. 13 in a table.

TABLE 1

| SAMPLE | A(COMPARATIVE GROUP) | B(FIRST EMBODIMENT) | C(FIFTH EMBODIMENT) |
|---|---|---|---|
| CURRENT DENSITY(mA/cm$^2$) | 34.365 | 27.387 | 26.258 |

Due to the addition of a cover window 80 and a color layer 70 to the solar module 1, there was a concern about a decrease in power generation, so a comparative experiment was conducted on three modules as shown in Table 1 and FIG. 13 above. Sample A is an existing solar module 1 without the color layer 70, and sample B is a solar module 2*a* of a second embodiment in which the color layer 70 cannot be changed. Sample C was tested with a color variable solar module 5 of a fifth example. A scattering layer was not included. All were manufactured using 1 Cell of 156 mm×156 mm solar cell 1 cell, and the color of the color layer 70 was blue. Electrical properties were measured under standard conditions (25° C., 100 mW/cm$^2$) using the same experimental equipment. As a result, looking at the effect of insertion of the color layer 70, the current density decreased for both Sample B and Sample C compared to Sample A. Electrical properties were measured under standard conditions (25° C., 100 mW/cm$^2$) using the same experimental equipment. As a result, looking at the effect of insertion of the color layer 70, the current density decreased for both Sample B and Sample C compared to Sample A. However, a difference in the current density between sample C, where the color layer 70 is replaceable, and sample B, which is not replaceable, was only 4%, so the power generation loss was not high, even though the air layer 110 and the cover window 80 are added as the colors are interchangeable, so the cover window 80 and the color layer 70 may be formed not only in an integrated form, but also in a form in which the color of the cover window 80 and the color layer 70 may be changed by adding a fixing portion 120. From this, when comparing the degree of power generation by sunlight in the third to seventh embodiments with that of the first embodiment, it can be inferred that there is no significant difference. In the case of the second embodiment, the path through which sunlight passes is the same as that of the fifth embodiment, so it will not be discussed.

While example embodiments have been illustrated and described above, it will be apparent to those skilled in the art that modifications and variations could be made without departing from the scope of the present disclosure as defined by the appended claims.

DESCRIPTION OF REFERENCE CHARACTERS

1: SOLAR MODULE WITHOUT A COLOR LAYER
2A, 2B, 2C: SOLAR MODULE WHOSE COLOR CANNOT BE CHANGED
3: SOLAR COLOR MODULE
4, 5, 6, 7: COLOR VARIABLE SOLAR MODULE
10: SOLAR CELL
20: ENCAPSULANT
30: SURFACE LAYER
40: BACK SHEET
50: FRAME
70: COLOR LAYER
80: COVER WINDOW
90: SPACER
110: AIR LAYER
120: FIXING PORTION
130: SEALING MEMBER

The invention claimed is:

1. A solar color module, comprising:
a color layer forming a color; and
a fixing portion coupling the color layer to a solar module so that the color layer is configured to be installed on and removed from the solar module, the fixing portion comprising a hinge portion formed to be rotatable.

2. The solar color module of claim 1, further comprising:
a cover window coupled with the color layer in a layered structure.

3. The solar color module of claim 1, further comprising:
a sealing member sealing air located between the color layer and the solar module.

4. The solar color module of claim 1, wherein the fixing portion further comprises
a locking portion formed to protrude from a surface extending from the hinge portion.

5. The solar color module of claim 1, wherein the fixing portion is formed with a certain thickness or density,
a thickness of the hinge portion is thinner than the thickness of the fixing portion, or
a density of the hinge portion is lower than the density of the fixing portion.

6. The solar color module of claim 3, wherein the sealing member is formed of a polymer that is deformable according to pressure.

7. The solar color module of claim 3, wherein
a first groove formed to be concave is provided on a surface of the color layer, and
the sealing member is inserted into and fixed to the first groove.

8. A color variable solar module, comprising:
a solar cell generating power using incident sunlight;
an encapsulant sealing the solar cell from the outside;
a surface layer provided to protect the solar cell on a surface of the encapsulant;
a frame fixing a structure of the solar cell, the encapsulant, and the surface layer;
a color layer laminated over the surface layer; and
a fixing portion attached to or formed integrally with the frame and fixing the color layer, the fixing portion comprising a hinge portion formed to be rotatable.

9. The color variable solar module of claim 8, further comprising:
a sealing member which is in contact with the frame or the surface layer, and is deformable according to pressure.

10. The color variable solar module of claim 8, wherein the fixing portion further comprises
a locking portion formed to protrude from a surface extending from the hinge portion; and
a pressing portion connected to the hinge portion and applying force from the outside to fix the hinge portion so that the hinge portion is not rotatable.

11. A color variable solar module, comprising:
a first module including a solar cell generating power using incident sunlight, and an encapsulant sealing the solar cell from the outside;
a second module including a plate-shaped color layer forming color; and
a fixing portion in which a coupling structure which allows the first module and the second module to be coupled and separated, the fixing portion comprising a hinge portion formed to be rotatable.

12. The color variable solar module of claim 11, further comprising:
a cover window coupled with the color layer in a layered structure.

13. The color variable solar module of claim 12, wherein a second groove or a step, formed to be concave on a surface of the cover window is formed, and
the fixing portion has one end attached to the first module and the other end including a locking protrusion fitted into the second groove or step.

14. The color variable solar module of claim 11, further comprising:
a sealing member located between the first module and the second module, and sealing air located between the first module and the second module.

15. The color variable solar module of claim 11, wherein the fixing portion is formed with a certain thickness or density, and
a thickness of the hinge portion is thinner than the thickness of the fixing portion or a density of the hinge portion is lower than the density of the fixing portion.

16. The color variable solar module of claim 14, wherein the sealing member is formed of a polymer that is deformable according to pressure.

17. The color variable solar module of claim 11, wherein the fixing portion is attached to or coupled to the second module,
the fixing portion further comprising:
a fitting groove formed to be concave on a surface formed to extend from the hinge portion, and
a fitting protrusion formed on the first module and corresponding to the fitting groove.

* * * * *